Feb. 5, 1957 R. T. ERBAN 2,780,136
KINOPTIC DEVICES
Filed March 10, 1952 2 Sheets-Sheet 2
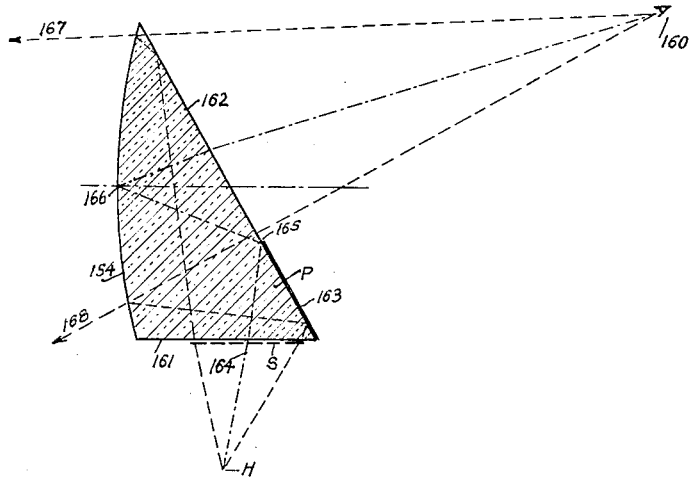
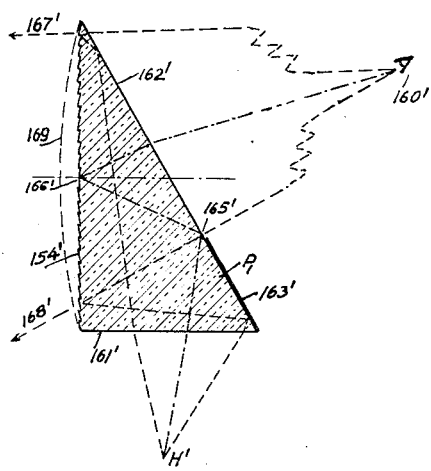
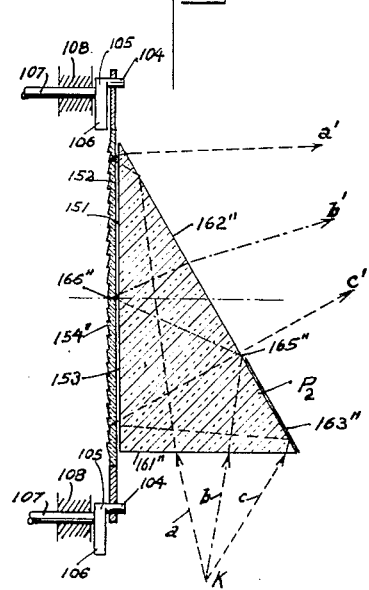
INVENTOR.
RICHARD T. ERBAN

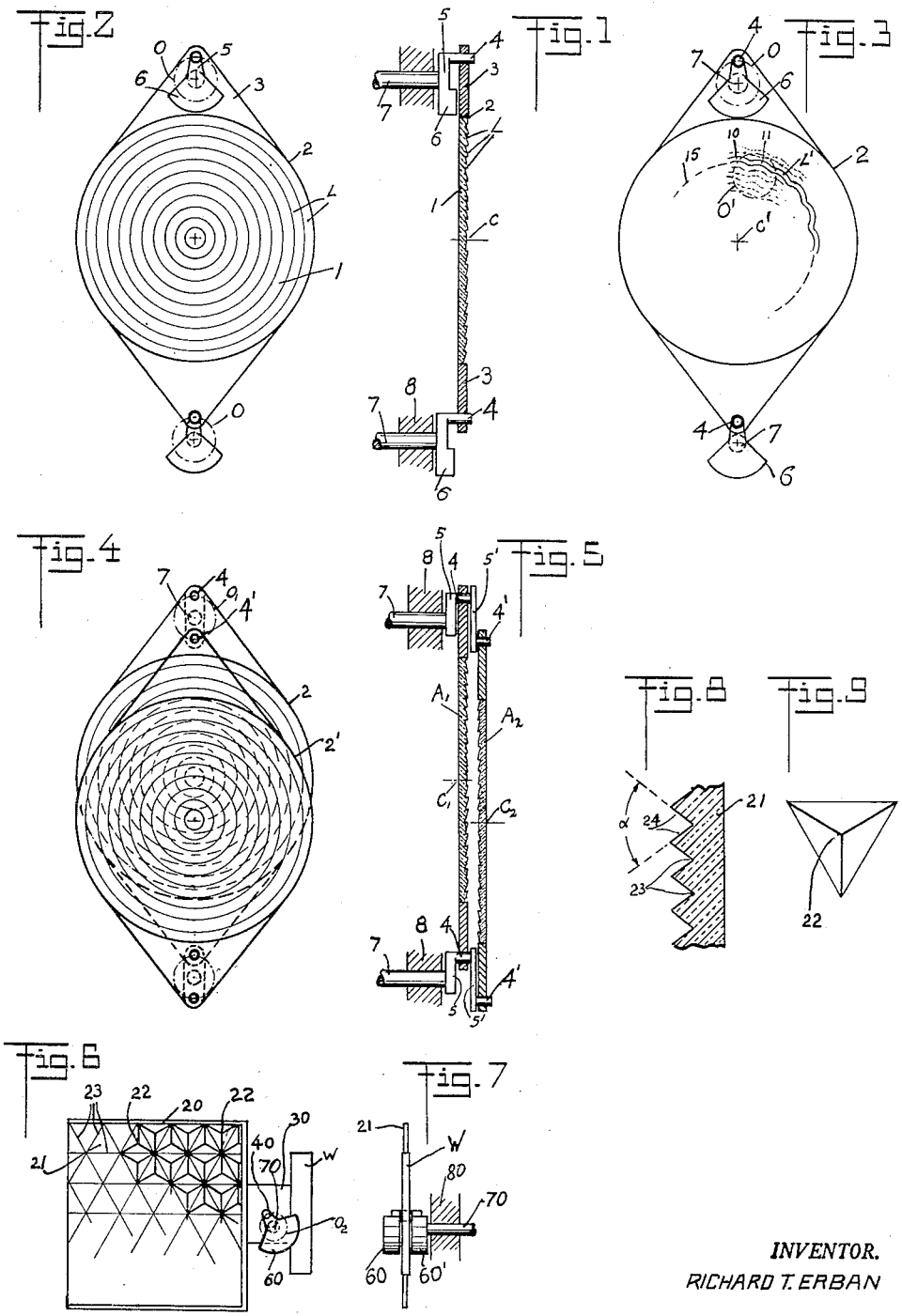

2,780,136

KINOPTIC DEVICES

Richard T. Erban, New York, N. Y.

Application March 10, 1952, Serial No. 275,760

3 Claims. (Cl. 88—28.93)

This invention relates to optical devices and is a continuation in part of my copending application Ser. No. 778,571, now Patent No. 2,588,373.

In one of its aspects, my invention relates to devices which combine optical elements of a special kind with means for producing mechanical orbital motion at frequencies superior to that of visual perception. While it has been proposed to impart to a composite lens screen a circuitous orbital motion, such devices do not properly fall under the term "kinoptic devices" as hereinafter explained, because they are in no way related to applicant's device. Their purpose and their structure is such that they impart a visible motion to a motionless image through the application of a moving lens; while applicant's device, to the contrary, eliminates all signs of visible motion from an optical image observed through a moving lens.

In order to establish a clear line of distinction between these two groups of devices, it appeared desirable to designate the new structures with a specific term; accordingly, the term "kinoptic devices" is herein used to cover all forms of this invention which conform to the above outlined general characteristics. In experimenting with such devices, I have found that their new and advantageous effects can be usefully produced only if several conditions are fulfilled, which are neither to be expected, nor to be found out without comprehensive research and investigation. To produce clear images of high resolution requires that all vibrations throughout the entire system be completely eliminated; the orbital motion of the optical element must be restricted to its predetermined path and disturbing harmonics prevented from superimposing their motion; other factors will from time to time be pointed out in the following specification.

It is among the objects of my invention to provide balancing means and compensating structures which will prevent all disturbing vibrations in a system having kinoptic elements and thereby produce clear, sharp images of high resolution not attained by any other method.

In another of its aspects, my invention provides new and useful combinations of kinoptic devices alone or with other optical elements, such combinations having a combined effect in excess of a mere summation of its parts. These and other objects of my invention will be described and explained as to their operation in the following specification; in the drawings, several embodiments of my invention are illustrated by way of example; the optical elements illustrated are mostly in the form of Fresnel type lenses or lens screens, and of several variations thereon; and all of the types illustrated have the general characteristic in common that they are composites of small, recurring, light deflecting elements, that will as an entire unit, perform to achieve a distribution of light over a predetermined area; however, since the specific form of the composite forming the lens surface does not influence the primary object, that is the complete elimination of all traces of visible motion from the observed image, the lens surfaces will be described as being a "composite of light deflecting elements."

Figs. 1 and 2 disclose a sectional view and frontal view respectively of a kinoptic field lens having mechanical balancing means;

Figs. 1 and 3 illustrate in a similar way a kinoptic structure incorporating a new type of field lens.

Figs. 4 and 5 illustrate in frontal view and sectional view respectively, a kinoptic structure which combines mechanical and optical means for achieving a full balancing of the system.

Figs. 6 and 7 show front view and side view respectively of another structure, fully balanced mechanically and incorporate a composite light deflecting element of a new design.

Figs. 8 and 9 illustrate details of the aforementioned element.

Figs. 10 and 11 illustrate a new combination of optical elements, particularly susceptible to conversion into a kinoptic structure, and Fig. 12 shows a sectional view of such a structure including a kinoptic element.

Referring to Figs. 1 and 2, it will be found that they disclose the identical structure as shown in the Figs. 1 and 2 of my co-pending application Ser. No. 778,571, and that they bear the same reference numbers for the same parts. A lens of the Fresnel type, 1 having elements L is mounted in a frame 2 having brackets 3—3. These brackets are journalled to crank pins 4—4, which are set in motion simultaneously by means of the cranks 5—5 and the shafts 7—7. Bearings 8—8 are provided for these shafts 7—7 and each shaft is provided with a balancing mass 6. These masses 6—6 are positioned diametrically opposite to the cranks 5—5 as will be seen by inspection of Fig. 2.

It follows that in a device as described, synchronous rotation of the shafts 7—7 will cause each point of the field lens 1 to move in an orbit identical in size to the circular orbit described by the crank pins 4—4. In accordance with the results of my experiments, it is essential that the size and shape of the orbit is greater than the spacing of the ring elements, preferably an odd multiple of one half the width of the elements, to prevent coinciding of similar points of two different elements at maximum orbital distance. In this way, several ring shaped elements cover the same portion of the entire field during their orbital motion.

In order that the observer may perceive a clear optical image of high resolution, it is essential that all traces of motion be eliminated. According to this invention, the orbital motion must be of a super-visual frequency, that is, of a frequency superior to that of visual perception, just as a sound of a frequency superior to that of audible perception is imperceptible—supersonic.

It has been found however that motion at such frequencies (super-visual) is apt to produce harmonic vibrations of a nature to cause blurred images, unless special means are employed to prevent this. I have found that means for dynamic balancing must be incorporated in the system in order to insure freedom from disturbing vibrations.

A structure designed to obtain such balancing is schematically illustrated in Figs. 1, 2 and 3. The weight and radius of the center of gravity of each of the masses 6—6 is so selected, that static and dynamic balance is achieved with respect to the field lens 1 and the frame and brackets 2 and 3 which carry the lens. This has been found to be an effective means to prevent harmonic and other parasitical vibrations of the field lens and other parts of the structure, and thus avoid the described difficulties.

Fig. 3 illustrates a mechanical arrangement identical to that of Figs. 1 and 2, and it discloses a new form of a light deflecting element. As has been explained in detail in my co-pending application Ser. No. 778,571, a conventional Fresnel type field lens having one optical center produces for the observer an eye point or at best a small eye zone. A system of intermixed portions of several lenticular field lenses giving a somewhat enlarged eye zone, as described in connection with Fig. 4 of my co-pending application Ser. No. 778,571.

The new form of field lens illustrated schematically here in Fig. 3 comprises light deflecting elements one of which is partially shown; while being of general circular or spiral shape 15, it has a varying optical center due to a continuous change of curvature; this changing curvature gives to the element a wavy appearance, as may be clearly seen from Fig. 3, at 10 and 11. A cross section radially in any one point of the deflecting element through the geometric center of the lens, C', would look very similar to that shown in Fig. 1, but the distance of the steps from the center will change according to where the wave is cut by the cross section. This kind of deflecting element has a multitude of optical centers distributed over the surface of the field lens and they do not coincide with the geometrical center, except for such portions of the element as may be curved to a concentric circle.

A groove of the kind described may be produced by imparting a lateral oscillation to a cutting tool placed against the surface of the lens disc while it is being rotated. By changing the frequency of this oscillation of the tool with respect to the speed of rotation of the disc, the length of the waves can be controlled; by selection of the form of oscillation curve for the tool, the form of the waves can be altered and any desired pattern for the location of the optical centers, and thereby distribution of the light, obtained.

It is to be understood that the relation of orbit size and shape with respect to the dimension and shape of the pattern formed by similar portions of the elements (waves) must be such, that each point following an orbit path will transmit through similar portions of the said element as any other point so traveling in another orbit; otherwise the image will have a spotty or scaly appearance due to unequal light value distribution over the entire surface. Thus the orbit is substantially larger than the pattern of the deflecting element (waves) and the orbit relation, illustrated in Fig. 3 by the dotted orbit O' may be considered a minimum useable under favorable conditions only.

Fig. 4 illustrates another embodiment of my invention, in which the mechanical balancing is obtained mostly by a second lens body, so that the two lens bodies move always in opposite direction to each other. This structure can be regarded to develop from the system of Figs. 1 and 2 by substituting a second frame 2' with lens A₂ for the major portion of the balancing masses 6—6 and by providing crank pins 4'—4' diametrically opposite to the pins 4—4. All other parts of this device are similar to those described in Figs. 1 and 2 and they carry the same reference numbers. A device substantially identical to this has been illustrated in Figs. 18 and 19 of my copending application Ser. No. 778,571.

While the radii of the pins 4'—4' have been shown as of the same size as of the pins 4—4, so that both sets of pins travel in equal size circles, it is to be understood that this need not be the case, so long as the momentum of the lens A₂ with respect to the shafts 7—7 equals that of the lens A₁.

The system disclosed in Figs. 4 and 5 has another novel effect: by suitable selection of the power of the two lenses, they can be made to compensate optically for the motion of each lens, so that they act in each respect like a stationary lens, except that the dividing lines, or steps, between the ringshaped elements are invisible.

Figs. 6 and 7 disclose still another form of a fully balanced system, which has a novel feature in that it receives its orbital motion from only one point, the crank pin 40. Without the use of other means, it is impossible to impart uniform orbital motion to a disc from a point on the outside, for any frequency of motion except near or at its own natural frequency with respect to this point. This natural frequency for lenses of the size contemplated is very far below the required super-visual frequency, in all practical cases less than 10% of the frequency required.

Motion of the lens or screen 20, 21 with complete uniformity of the orbits for all points is achieved according to this invention by providing dynamic balancing means W which are spaced from the frame 20 of the field lens 21 by the member 30. The momentum of the mass W with respect to the center of crank pin 40 is made equal to the momentum of the lens 21 and frame 20, the member 30 being supposed to have no momentum with respect to 40. The crank pin 40 is carried by the shaft 70, which rotates in the bearing 80; the radius of the crank pin 40 determined the size of the orbit O₂ which is the orbital path as to size and shape common to all points of the lens 21.

Two balancing masses 60—60' are provided to both sides of the member 30 and in position of 180° opposition to the crank pin 40. The momentum of both masses 60—60' with respect to the shaft 70 is made equal to the momentum of the lens 21, frame 20, member 30 and balancing mass W with respect to shaft 70. A system of this kind has an advantage over the two-point drive as shown in Figs. 1 and 2 in that it eliminates the requirement for perfect synchronization of the two cranks which is critical at high frequencies.

The deflecting element shown in Fig. 6 is a tricornered pyramid having a very specific angle: its three surfaces are inclined at exactly 90° to each other. This has the peculiar effect that any light ray striking the hollow side must return to its point of origin; therefore it is impossible for a surface composed of such elements to reflect any outside light into the eye of the observer.

This system of tri-cornered pyramids may be formed by the intersection of 3 systems of parallel grooves, which form angles of 120° with each other, as seen in Fig. 6.

A cross section through one system of grooves is shown in Fig. 8. The side faces 24 of the grooves 23 are so inclined that the angle alpha is defined by the relation; cotan ½ alpha equal to square root of 2 and under these conditions, the material left standing after the intersecting of the 3 systems of grooves will form rows of tri-cornered pyramids, as shown, and the side angles of the surfaces will be 90°. A metal plate so machined and used as a die plate will produce in plastic a surface formed by hollow pyramids of the desired quality; it will be reflection free to the observer from any angle, since the only reflected rays that can strike his eyes are those emanating from his eyes.

It must be noted that in Fig. 6 the relative size of the grooves and pyramids has been exaggerated for the purpose of clarity of disclosure. The relative size of the light deflecting elements with respect to the orbit must be a small fraction, as has been explained above.

Fig. 10 discloses an optical device for enlarging images by means of a combination of a concave reflecting surface with a prismatic body P. The concave surface 154 forms one side of the prism and has an optical axis 150. Another surface of the prism, 162, is inclined with respect to the optical axis 150 at substantially more than 45°, and this last named surface forms an acute angle with the bottom surface of the prism, 161. The lower portion 163, of the surface 162, is silvered, while the upper portion is clear or may be anti-reflection coated.

Light rays coming from a source H and passing through the subject S will reach the eye 160 after having been reflected internally by the surface 162 and again reflected by the concave surface 154. The central ray tracing is H—164—165—166—160, and the other rays follow similar paths, as shown. The eye sees the subject S in the extension of the rays, as marked with 167—168, to the rear of the concave mirror and the image is enlarged. There are several reasons which indicate the advantage of having the concave mirror 154 substantially flat. This may be achieved by replacing it with a Fresnel type lens surface, and silvering it, thus providing a Fresnel type concave mirror. This is illustrated in Fig. 11 where the Fresnel type mirror is 154' and all other reference numbers are the same as in Fig. 10 but with a' for distinction from Fig. 10.

The effects of the "steps" or "lines" of the Fresnel type surface 154' can be eliminated by substituting a kinoptic concave mirror 154" for the static mirror 154'. This is illustrated in Fig. 12, where a prism P", similar in shape to prism P' of Fig. 11, receives an image projected from a source K. The rays a, b, c, enter the prism through the surface 161", are internally reflected from the surface 162", and pass through the rear surface 153 which is flat and not silvered. After passing through the interspace 151, the rays enter the Fresnel type mirror through its flat front surface, are reflected by the grooved concave surface 154" and after re-crossing the interspace and the prism P" they emanate as a", b", c", towards the observer.

The means for obtaining orbital motion of the mirror 154" are illustrated similarly to those described in connection with Figs. 1 and 2. Crank pins 104—104 fastened to cranks 105—105 cause orbital motion when the shafts 107—107 are rotated. Balancing means 106—106 are provided to operate substantially in the same way as described with respect to Figs. 1 and 2.

It is to be noted that the flat side of the Fresnel type lens serving as concave mirror, must be positioned facing the flat surface 153 of the prism P₂, as shown. The device illustrated in Fig. 12 produces clear images free of interference from "lines" or "steps" due to the grooved Fresnel type structure of the mirror 154" when the projecting source K is arranged to form a real optical image on the surface of 154"; the concave Fresnel type mirror serves in the manner of a field lens under these conditions.

While I have described several specific forms of embodiment of my invention, it is to be understood that these are given by way of examples of the various forms in which my invention may be carried out without departing from its basic structure; in particular, while I have shown the means for imparting orbital motion to the deflecting elements in the form of mechanical cranks operated by rotating shafts, such orbital motion may be imparted by mechanical means other than cranks, and also by electrical and magnetic means without changing anything in the effectiveness of the device, provided that balancing means are set in motion in opposite direction and relative position as described, so that full static and dynamic balance is obtained for the entire system; and all such variations and modified forms shall be understood to come within the scope of this invention which shall be limited only as defined by the following claims.

What I claim is:

1. In an optical device of the class described, a field lens having at least one of its surfaces composed of closely spaced light deflecting elements, means for imparting to said lens orbital motion with a width of the orbital path substantially greater than the spacing of the said elements, the frequency of said orbital motion being greater than the limit of frequency of visual perception, and balancing means for said field lens, said last named means comprising a pair of inertia masses positioned near the edge of said lens at opposite points thereof.

2. An optical device of the class described, comprising a lens composed of a multitude of light deflecting elements, means supporting said lens and adapted to cause orbital motion thereof at a frequency higher than the limit of frequency of visual perception, the size of said light deflecting elements, their spacing and the size of the orbit being so arranged with respect to each other that the orbit will transit over a multitude of said elements, and means for causing dynamic balancing of said motion, said last named means comprising inertia masses positioned adjacent the periphery of said lens and at substantially equal distances from the center of the lens whereby the lens is substantially in the middle between said masses.

3. An optical device of the class described, comprising a lens having one surface composed of a multitude of light deflecting elements, a pair of mechanical cranks positioned adjacent the edge of said lens at points substantially opposite each other with respect to the center of the lens, means operatively connecting said cranks to said lens for imparting orbital motion to the lens, the size of the orbit path caused by said cranks being a multiple of the spacing of said light deflecting elements, means comprising two crankshafts for imparting to said cranks a rotational frequency higher than the limit of visual perception, and balancing means including inertia masses connected to said crankshafts in a position opposite to said cranks whereby said masses are always located near the edge of the lens and the lens substantially in the middle between said masses.

References Cited in the file of this patent
UNITED STATES PATENTS

| 2,029,500 | O'Brien | Feb. 4, 1936 |
| 2,139,855 | Genies | Dec. 13, 1938 |
| 2,348,818 | Jacobson | May 16, 1944 |
| 2,432,896 | Hotchner | Dec. 16, 1947 |

FOREIGN PATENTS

| 590,981 | Great Britain | Aug. 1, 1947 |